United States Patent
Terentyev et al.

(10) Patent No.: US 7,027,925 B2
(45) Date of Patent: Apr. 11, 2006

(54) ADAPTIVE BOREHOLE ASSEMBLY VISUALIZATION IN A THREE-DIMENSIONAL SCENE

(75) Inventors: Igor Terentyev, Houston, TX (US); Mathieu Will, Missouri City, TX (US); Denis J. Heliot, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 226 days.

(21) Appl. No.: 10/708,929

(22) Filed: Apr. 1, 2004

(65) Prior Publication Data

US 2005/0217896 A1    Oct. 6, 2005

(51) Int. Cl.
*G06F 17/00* (2006.01)
(52) U.S. Cl. .................................................. 702/9
(58) Field of Classification Search ............... 702/9, 702/6; 73/152.01, 152.02, 152.03, 152.43; 175/45, 50; 340/853.6; 703/10
See application file for complete search history.

(56) References Cited

U.S. PATENT DOCUMENTS

| | | | | |
|---|---|---|---|---|
| 5,812,493 A | * | 9/1998 | Robein et al. | 367/25 |
| 5,917,160 A | * | 6/1999 | Bailey | 181/112 |
| 6,078,867 A | * | 6/2000 | Plumb et al. | 702/6 |
| 6,282,452 B1 | * | 8/2001 | DeGuzman et al. | 700/32 |
| 6,389,360 B1 | * | 5/2002 | Alft et al. | 702/9 |
| 6,438,495 B1 | | 8/2002 | Chau et al. | |
| 6,862,530 B1 | | 3/2005 | Fleury et al. | |
| 2002/0050989 A1 | | 5/2002 | Sanstrom | |
| 2003/0403170 | | 3/2003 | Fleury | |
| 2003/0234782 A1 | | 12/2003 | Terentyev et al. | |
| 2004/0204855 A1 | | 10/2004 | Fleury et al. | |

* cited by examiner

*Primary Examiner*—Donald McElheny, Jr.
(74) *Attorney, Agent, or Firm*—Osha Liang; Kevin P. McEnaney; Victor H. Segura

(57) ABSTRACT

A method for displaying a bottom-hole assembly together with a borehole trajectory includes displaying the borehole trajectory in a display window; and displaying the bottom-hole assembly in the display window such that the borehole trajectory and the bottom-hole assembly are in parallel and a measurement depth of the bottom-hole assembly corresponds to a measurement depth of the borehole trajectory.

25 Claims, 5 Drawing Sheets

ADAPTIVE BOREHOLE ASSEMBLY VISUALIZATION IN A THREE-DIMENSIONAL SCENE

BACKGROUND OF INVENTION

1. Field of the Invention

The invention relates generally to methods and systems for analyzing data generated in oilfield exploration. More particularly, the invention relates to methods and systems that facilitate the analysis of downhole data or bottom-hole assembly data.

2. Background Art

Wells are generally drilled into the ground to recover natural deposits of oil and gas trapped in geological formations. A well is drilled into the ground and directed to the targeted geological location from a drilling rig at the Earth's surface. While the well is being drilled or after it is drilled, drillers often investigate the formation and its contents using various sensors, such as resistivity sensors, nuclear magnetic sensors, neutron sensors, gamma ray sensors, etc. These sensors may be lowered into the well on a wireline to take measurements after the well is drilled. Alternatively, the measurements or logging may be performed while drilling (MWD or LWD). With MWD or LWD, the sensors are included in a bottom hole assembly (BHA). A typical BHA includes the drill bit and a plurality of subassemblies (subs) that house various sensors. Data may be obtained about the borehole and drilling fluid properties in the borehole or about the properties of the formation and formation fluids. These data are generally referred to as downhole data.

Due to different properties of the sedimentation layers in the formation, formation stresses and formation fluid pressures may be different in different regions of the borehole, leading to washouts in some regions. These factors combined can produce a borehole that is irregular in shapes and sizes. These irregular shapes and sizes may cause the BHA to have irregular motions, such as different rotation speeds, wobbling, or vibration. The irregular motions of the BHA may have an adverse impact on the accuracy of the BHA or downhole data.

Therefore, it is desirable to be able to visualize (or recreate) the BHA and related data alongside a three-dimensional (3D) borehole trajectory so that the BHA data may be correlated with other data, e.g., logging data (3D images), caliper data (3D borehole shape), etc., alongside the 3D borehole trajectory. Particularly, it would be desirable to be able to correlate any anomaly in the BHA data with other data.

Visualization of a borehole trajectory presents unique problems. The thin and long 3D structure of the wellbore (typically having a diameter of 1 foot or less and a length of several miles) makes it difficult for a user to see the overall picture of the borehole and, at the same time, to see the detailed structures of the borehole. Published U.S. Patent Application No. 2003/0043170 A1 by Fleury and published U.S. Patent Application No. 2003/0234782 A1 by Terentyev et al. disclose methods that are particularly suitable for displaying the 3D borehole trajectory to facilitate data analysis. Co-pending U.S. patent application Ser. Nos. 10/604,062 and 10/250,049, both by Fleury et al., filed on Nov. 4, 2003, disclose methods for conveniently displaying multiple sets of formation measurement data alongside the 3D borehole trajectory.

There still exists a need for convenient methods and systems that permit the user to observe the BHA data in 3D and to correlate the BHA data or BHA motions with other data displayed along the 3D borehole trajectory.

SUMMARY OF INVENTION

One aspect of the invention relates to a method for displaying a bottom-hole assembly together with a borehole trajectory. A method in accordance with one embodiment of the invention includes displaying the borehole trajectory in a display window; and displaying the bottom-hole assembly in the display window such that the borehole trajectory and the bottom-hole assembly are in parallel and a measurement depth of the bottom-hole assembly corresponds to a measurement depth of the borehole trajectory.

One aspect of the invention relates to a method for displaying a bottom-hole assembly together with a borehole trajectory. A method in accordance with one embodiment of the invention includes displaying the borehole trajectory in a first window; displaying the bottom-hole assembly in the first window such that the borehole trajectory and the bottom-hole assembly are in parallel and a measurement depth of the bottom-hole assembly corresponds to a measurement depth of the borehole trajectory; and displaying an expanded view of the first window in a second window, wherein the expanded view includes a portion of the borehole trajectory and a corresponding section of the bottom-hole assembly.

One aspect of the invention relates to a system for displaying a bottom-hole assembly together with a borehole trajectory. A system in accordance with one embodiment of the invention includes a processor and a memory storing a program having instructions for: displaying the borehole trajectory in a display window; and displaying the bottom-hole assembly in the display window such that the borehole trajectory and the bottom-hole assembly are in parallel and a measurement depth of the bottom-hole assembly corresponds to a measurement depth of the borehole trajectory.

One aspect of the invention relates to a system for displaying a bottom-hole assembly together with a borehole trajectory. A system in accordance with one embodiment of the invention includes a processor and a memory storing a program having instructions for: displaying the borehole trajectory in a first window; displaying the bottom-hole assembly in the first window such that the borehole trajectory and the bottom-hole assembly are in parallel and a measurement depth of the bottom-hole assembly corresponds to a measurement depth of the borehole trajectory; and displaying an expanded view of the first window in a second window, wherein the expanded view includes a portion of the borehole trajectory and a corresponding section of the bottom-hole assembly.

Other aspects and advantages of the invention will be apparent from the following description and the appended claims.

DETAILED DESCRIPTION

Embodiments of the invention relate to methods for displaying bottom hole assembly (BHA) alongside a 3D wellbore trajectory so that the BHA data may be easily correlated with the borehole structure and/or formation property measurements. A method in accordance with the invention may comprise displaying BHA and the 3D borehole trajectory in one or more display windows, each displaying a different scene for different analysis. A synchronization system may also be provided to synchronize displays in various windows so that point of interest (POI) on the section of the borehole under investigation is the same in all windows.

Figure 1:
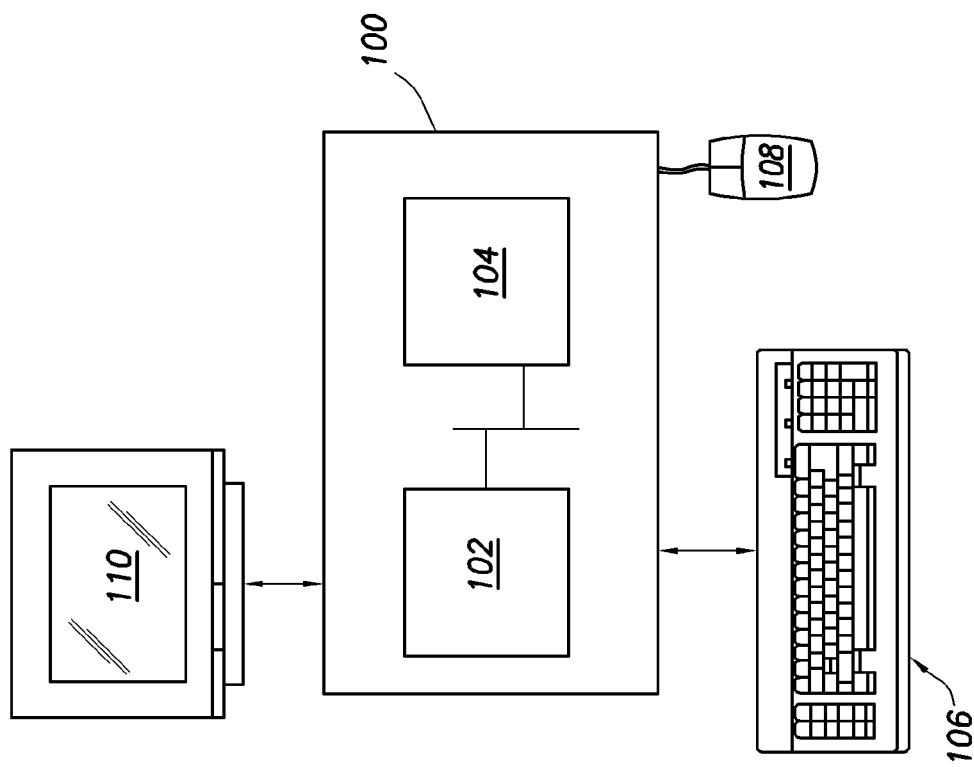
FIG. 1 shows a prior art computer that may be used with embodiments of the invention.

Embodiments of the invention may be implemented on any computer. FIG. 1 shows a general computer that may be used with embodiments of the invention. As shown, the computer includes a display 110, a main unit 100, and input devices such as a keyboard 106 and a mouse 108. The main unit 100 may include a central processor 102 and a memory 104. The memory 104 may store programs having instructions for performing methods of the invention.

The programming may be accomplished through the use of one or more program storage devices readable by the computer processor and encoding one or more programs of instructions executable by the computer for performing the operations. The program storage device may take the form of, e.g., one or more floppy disks; a CD ROM or other optical disk; a magnetic tape; a read-only memory chip (ROM); and other forms of the kind known in the art or subsequently developed. The program of instructions may be in object cods or source codes. The precise forms of the program storage device and of the encoding of instructions are immaterial here.

Figure 2:
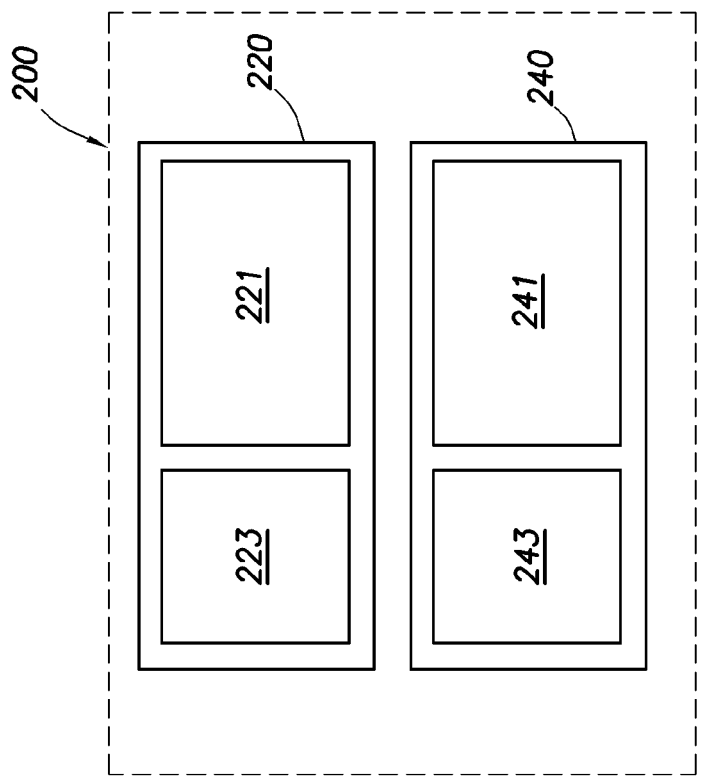
FIG. 2 illustrates a display system in accordance with one embodiment of the invention.

FIG. 2 shows an exemplary system in accordance with one embodiment of the invention for displaying BHA and borehole trajectory. As shown in this example, the system 200 may include two windows: a big-view window 220 and a small-view window 240. One of ordinary skill in the art would appreciate that embodiments of the invention may use any number of windows for the displays, and the number of windows used in the examples in this description is not intended to limit the present invention. The big-view window 220 may comprise a single window for displaying a long section of the borehole trajectory or the entire borehole trajectory together with the BHA to give the user a better perspective of the entire well. In some embodiments, the big-view window 220 may comprise more than one sub-windows, such as the two sub-windows 221 and 223. In this case, the sub-window 221 may be used to display the BHA and the 3D borehole trajectory, while the sub-window 223 may be used to display conventional logs corresponding to the borehole section displayed in sub-window 221. The displays in sub-windows 221 and 223 may be synchronized such that changing the displayed section of the borehole trajectory in one sub-window will cause a corresponding change in the other sub-window.

The small-view window 240 may comprise a single window for displaying a small section of the borehole trajectory and BHA in more details to permit a user to analyze data related to the BHA or the borehole. In some embodiments, the small-view window 240 comprise more than one sub-window, such as the two sub-windows 241 and 243. In this case, the sub-window 241 may be used to display the BHA and the 3D borehole trajectory, while the sub-window 223 may be used to display conventional 2D graphs (logs) corresponding to the images in the sub-window 241. In some embodiments, the displays in the sub-windows 241 and 243 are synchronized such that a change of the displayed section in one sub-window will cause a corresponding change in the other sub-window.

The synchronization system may also allow the displays in the big-view window 220 and the small-view window 240 to be synced. For example, the 3D trajectory may be translated so that the point of interest (POI) is moved to a new location on the 3D trajectory in a first view. Then, the synchronization system ensures that the other views that are synced to the first view are updated to reflect the changes in the first view. Accordingly, an embodiment of the invention for displaying the BHA data may include methods for visualizing the BHA data in a big-view window, a small-view window, and interactions between them.

BHA in the Big View

Figure 8:
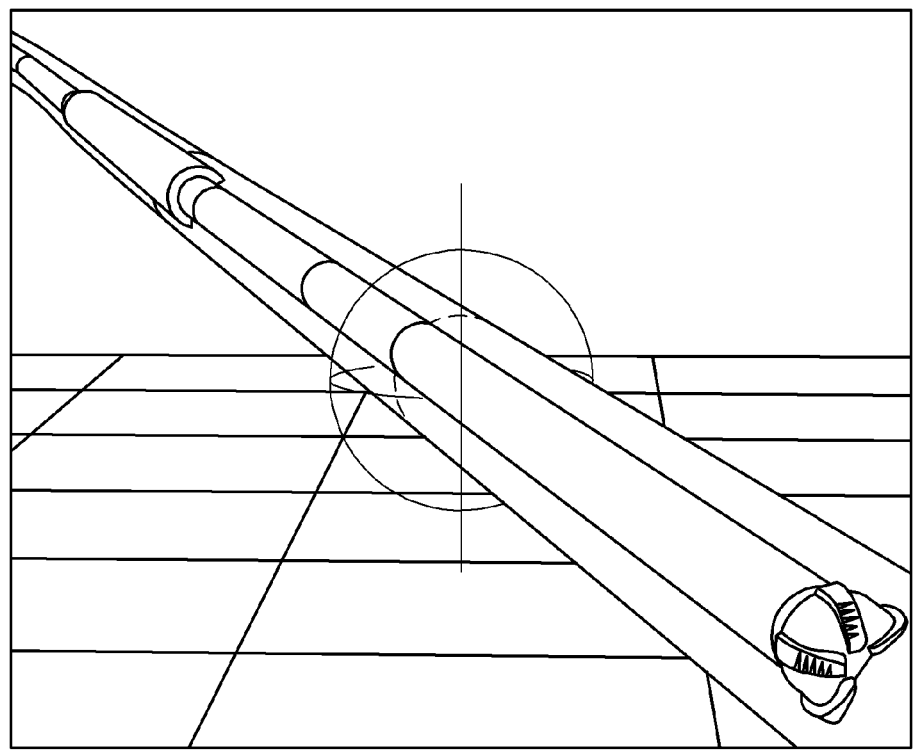
FIG. 8 illustrates a display of BHA inside a borehole trajectory in accordance with one embodiment of the invention.

In the most natural way, the BHA is displayed inside the borehole, as shown in FIG. 8, which will be described in more detail with respect to the small-view window later. However, because one is often interested in only the axial locations of the BHA along the borehole, the BHA may also be displayed outside the borehole trajectory. To display the BHA outside the borehole while allowing the borehole trajectory to remain visible, the BHA may be displayed concentric with the borehole in semitransparent (or transparent) colors or displayed alongside the borehole trajectory. Note that "semitransparent" is used generally in this description to include both semitransparent and transparent.

Figure 3:
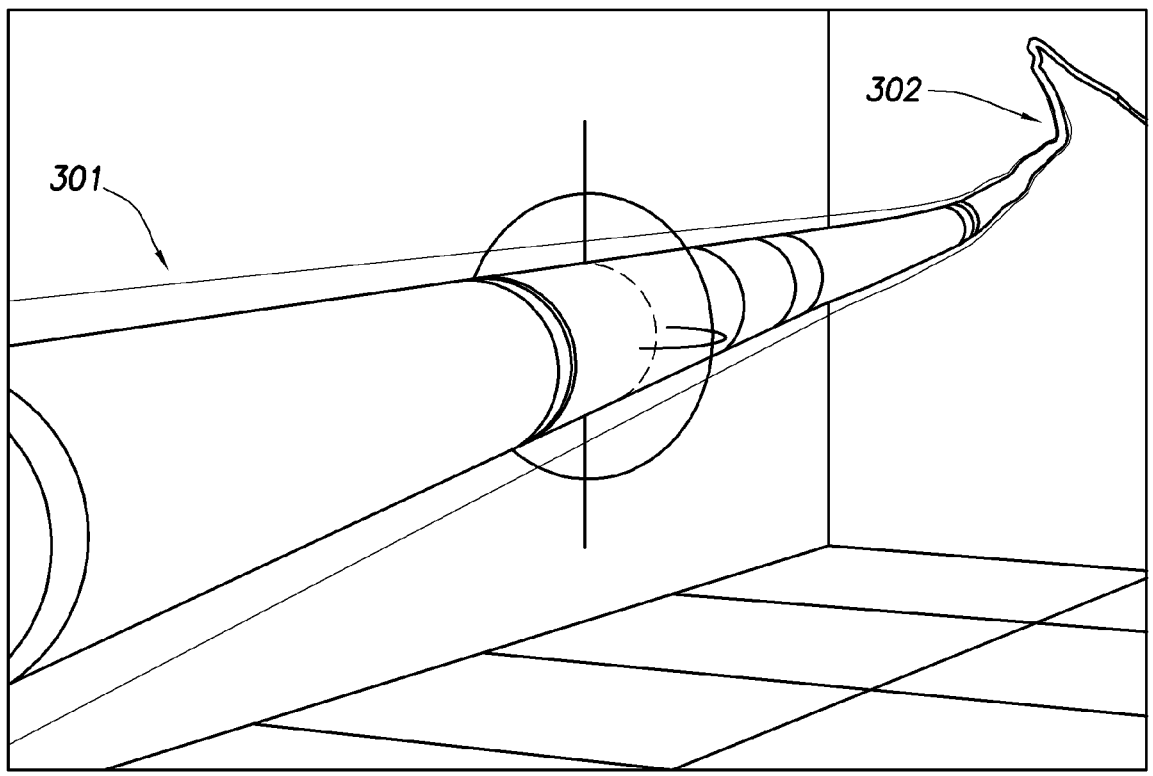
FIG. 3 illustrates a display of a borehole trajectory and BHA in accordance with one embodiment of the invention.

In accordance with some embodiments of the invention, BHA structure and position are visualized by a sequence of semitransparent cylinders placed around the well trajectory, as shown in FIG. 3. The transparency of each cylinder may be defined in several ways. For example, the BHA cylinders may be displayed with a similar transparency. Alternatively, the transparency of each BHA cylinder may be different, depending on one or more selected parameters such as the camera positions and zoom factors. As shown in FIG. 3, the BHA cylinder 301 is closer to the camera, it is shown more transparent so that the user can easily see the 3D borehole trajectory. The BHA cylinder 302 is farther from the camera, and thus it is made more opaque in this case, the user cannot observe the image in details and it will be desirable to see the locations of the BHA components along the borehole trajectory.

In some embodiments, the radius of a cylinder is also determined by the camera position and the zoom factors. One of ordinary skill in the art would appreciate that several methods are available to achieve this. For example, the transparency and the radius of a BHA cylinder may be determined according to the following method.

The shape of the BHA in the borehole (or the track traversed by the BHA in the borehole) may be represented as a series of cylindrical sections. The length of each section of the BHA cylinders may be selected for convenient display (e.g., 10 ft or 20 ft sections) or determined as a function of the total trajectory length. Alternatively, the length of the BHA cylinder may be selected to correspond to the actual BHA component lengths used in drilling the well.

By representing the BHA as a series of cylindrical sections, the transparency of the BHA sections may simply be determined as their relative locations along the trajectory. Alternatively, the transparency of a particular BHA section may be determined by its distance to the camera.

Figure 4A:
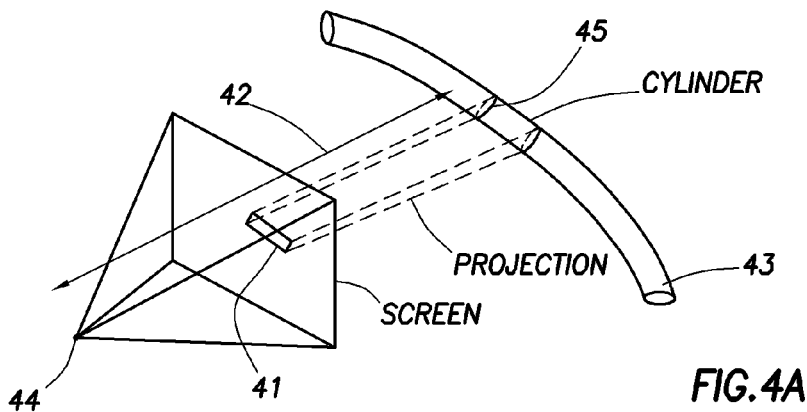
FIGS. 4A–4C illustrate a method for determining the display widths and transparencies of BHA in accordance with one embodiment of the invention.
Figure 4B:
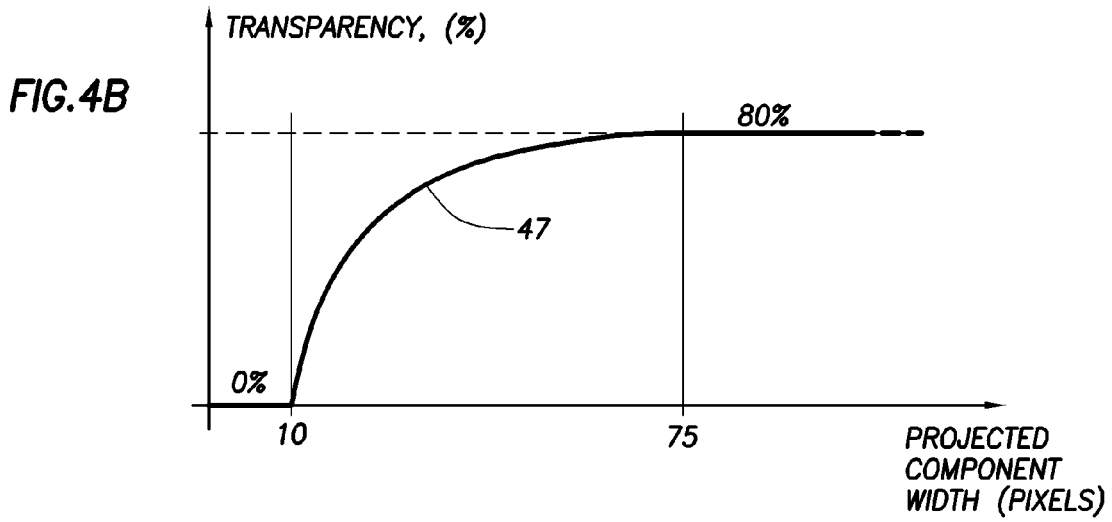
Figure 4C:
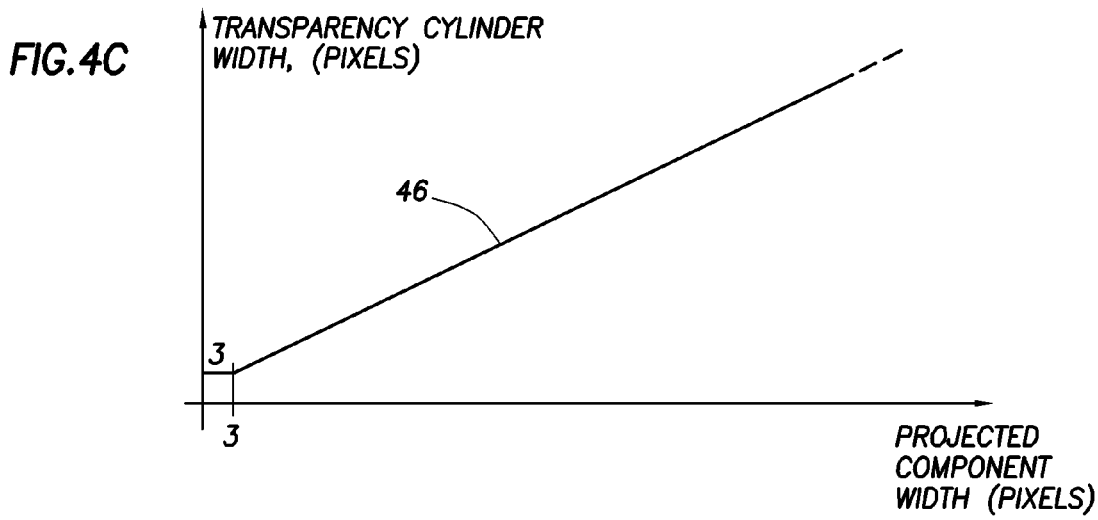

FIGS. 4A–4C illustrate a method that may be used to determine the radius and transparency of a BHA section as a function of its distance to the camera. As shown in FIG. 4A, the screen width (or display width) of a cylinder as a perspective projection on the screen is calculated with respect to the camera position. For example, the screen width 41 may be determined as a function of an inverse of the distance 42 between the BHA section 43 and the camera 44 and the actual width 45 of the BHA cylinder. FIG. 4C illustrates one such function. As shown, the cylinder width (in pixels) of a BHA section is shown in the vertical axis and the projected cylinder width (in pixels) is shown in the horizontal axis. The cylinder width shown depends linearly on the projected width, or vice versa. The line 46 representing such a relationship may have a slope that is a function of the distance (shown as 42 in FIG. 4A) between the camera (shown as 44 in FIG. 4A) and the BHA cylinder (shown as 43 in FIG. 4A).

Once the screen width of a particular section is determined, the screen width may be used to determine the transparency of the cylinder. One of ordinary skill in the art would appreciate that various functions (e.g., linear, hyperbolic, etc.) may be used to determine the transparency from the radius of the section. FIG. 4B shows an example, in which the transparency of the BHA section is determined as a hyperbolic function 47 of the radius of the displayed cylinder.

In some embodiments, the BHA may be represented as a simple cylinder, if the depth of the BHA in the borehole is of primary concern. In some embodiments, the BHA may be represented in 3D shapes that correspond to various shapes of the BHA components (e.g., stabilizers, etc.) to facilitate the identification of the various components. In some embodiments, different components in a BHA may be shown in different colors, in addition to different transparencies. For example, the users may be permitted to customize different colors for different components of the BHA. One of ordinary skill in the art would appreciate that 3D shapes, colors, and transparency may be used in any combination to represent the BHA in accordance with embodiments of the invention. Furthermore, display animation (e.g., blinking or motion), to be described later, may also be used to enhanced the visualization of the BHA.

Figure 5:
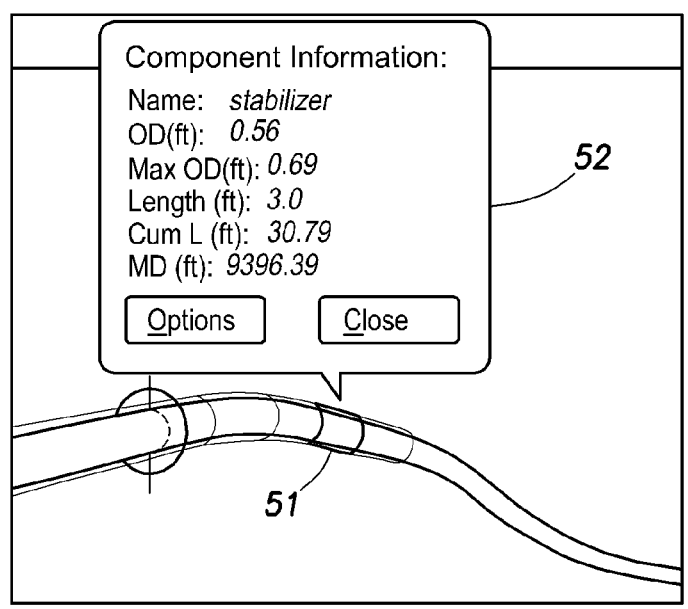
FIG. 5 illustrates a display of BHA components in accordance with one embodiment of the invention.

FIG. 5 illustrates an embodiment in which various components of the BHA are shown in different colors. This allows the user to distinguish the components easily even when the camera is zoomed out. In addition, this facilitates the correlation between the BHA data and the corresponding BHA components, making the analysis easier.

Embodiments of the invention are particularly suitable for visualizing BHA related data, such as rotation, shocks, etc. Some of the BHA related data may be displayed as animations. For example, rotation or wobbling of the displayed BHA may be used to illustrate the rotation and wobbling of the BHA that occurred during the drilling operation. For example, as shown in FIG. 5, the user can select a BHA component 51 in the 3D display by clicking on it with the mouse or using any other input device (e.g., a key board). Then, information (e.g., the name, properties, operational parameters, rotation, and shock) 52 related to the selected component 51 may be displayed. The user may also be allowed to perform different actions on the selected component, e.g., animate the rotation or the shock of the component. In addition to "visualization" of the BHA components and BHA related data, audible information may also be used, either alone or in combination with the "visualization," to provide the BHA related data. For example, when the user selects a BHA components, the name (and its associated parameters) may be announced to the user. Similarly, the rotation or shock experienced by the BHA during the drilling operation may be simulated with sound effects.

The above example displays the BHA as a series of cylinders outside, but concentric with, the borehole trajectory. Displaying the BHA as a series of transparent cylinders gives the user a perception of the BHA locations along the borehole and allows for the observation of the 3D borehole trajectory at the same time.

Figure 6:
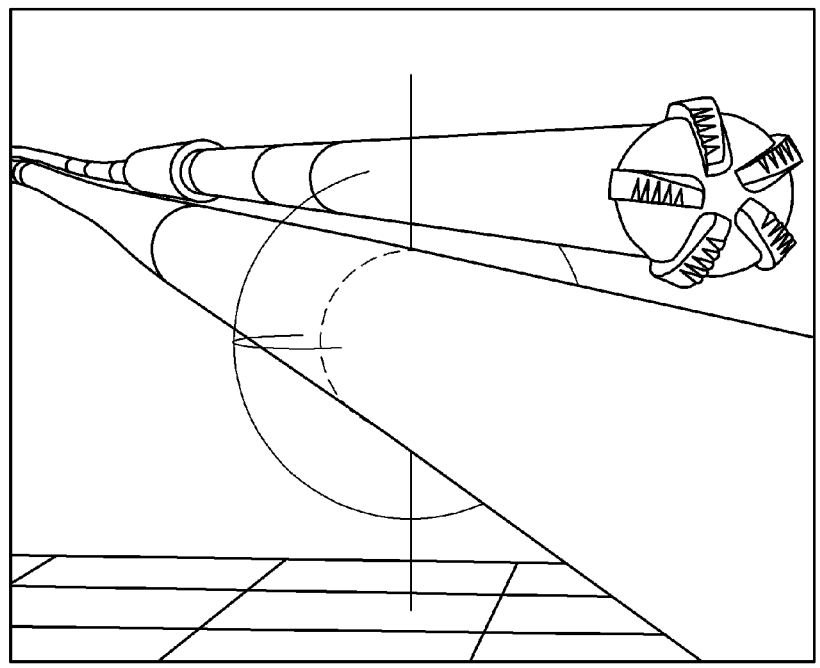
FIG. 6 illustrates another display of a borehole trajectory and BHA in accordance with one embodiment of the invention.

As noted above, the BHA may be displayed alongside the borehole trajectory. In this case, there is no need to display the BHA as transparent cylinders. Instead, the BHA may be rendered as surface shapes (referred to as "shape mode"), as shown in FIG. 6. Any surface rendering algorithms known in the art may be used for this purpose. This "shape mode" provides the user with visual information about the BHA components" types and diameters. In the shape mode, the BHA can be placed inside the borehole trajectory image, if the borehole trajectory is displayed in transparent colors, see for example FIG. 8. Alternatively, the BHA shapes may be displayed alongside (outside) the borehole, as shown in FIG. 6.

If the BHA shape is placed alongside the borehole trajectory, it is preferred to have an algorithm that draws the BHA shape in such a way that it is not obscured by the borehole trajectory when the camera (user's view point) moves. This algorithm automatically computes shifts for the components" shapes of the BHA from the borehole axis in such a way that the BHA shape is always located in front of (between the trajectory and the camera) or to the side of the trajectory, as shown in FIG. 7.

Figure 7:
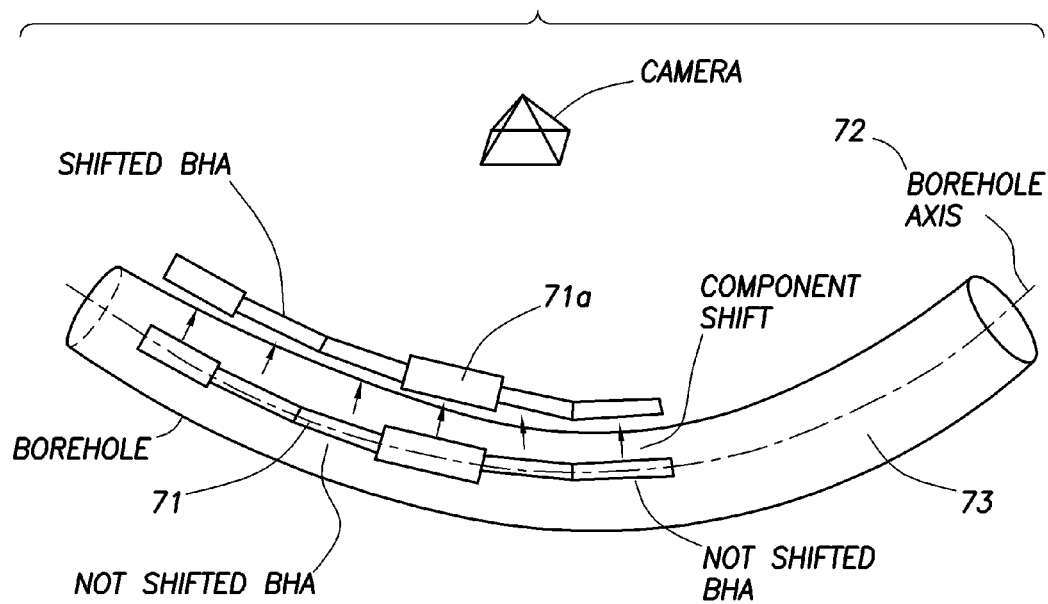
FIG. 7 illustrates a method for displaying BHA to the side of a borehole trajectory in accordance with one embodiment of the invention.

FIG. 7 illustrates a method that can ensure that display of the BHA shapes are not obscured by the borehole trajectory. For example, the BHA shapes 71 may be first computed along the borehole axis 72 inside a borehole trajectory 73. This step aligns the BHA components with their respective measurement depths. Next, the BHA shapes are shifted outside the borehole trajectory 73 and presented as BHA shapes 71a that is either to the side of the borehole trajectory or projected at a distance between the camera and the borehole trajectory.

In addition, the user may also be permitted to shift the BHA shape relative to the borehole trajectory (manual shift mode), preferably only around the borehole trajectory (i.e., orthogonally to the borehole axis) so that the measurement depths (MD), which are lengths of a borehole from the beginning of the trajectory, of the BHA shape remains aligned with the MD of the borehole trajectory. Furthermore, in the manual shift mode, the user may be allowed to put the BHA shape completely inside, partially inside, or completely outside the borehole trajectory. This manual shift may be accomplished according to, for example, the method illustrated in FIG. 7, by allowing the user to determine the shift of the BHA shapes 71a relative to the borehole axis 72. Adjusting the BHA shift manually allows the user to display the BHA data in the best way to correlate it with other 3D trajectory or formation measurement data.

As noted above, different components in a BHA may be shown in different shapes and/r colors (see FIG. 5). This allows the user to distinguish the components easily even when the camera is zoomed out. In addition, this facilitates the correlation between the BHA data and the corresponding BHA components, making the analysis easier.

Furthermore, displaying the BHA as a set of 3D semi-transparent or shaped cylinders together with the 3D borehole trajectory allows for visualization of additional information about the BHA components graphically. For example, by changing color, blinking, or changing cylinder shape, it is possible to display BHA motions (e.g., shocks and vibration) and other BHA data, to highlight or contrast the BHA actions or data.

BHA in Small View

While the big view provides the user a perspective of the locations of the BHA with respect to the 3D borehole trajectory, it would not be practical to also provide detailed information regarding the BHA data, borehole data, or formation measurement data on the same big-view window. Therefore, some embodiments of the invention also include a small-view window alongside the big-view window.

In accordance with some embodiments of the invention, the BHA in the small-view window is preferably shown as a set of component shapes. As in the big view, the BHA shape in the small view may be displayed inside the borehole, partially outside the borehole, or completely outside the borehole. If the BHA shape is displayed inside the borehole, as shown in FIG. 8, the borehole is shown as a semitransparent shape so that it does not obscure the BHA components. In addition, the BHA components may be displayed in different colors for easy identification and correlation with BHA data. Furthermore, when displaying the BHA shape, it is preferred that the components are displayed in proportion to their sizes and shapes in order to allow the user to correlate their positions with the borehole shape (caliper data).

In some embodiments, the BHA components may be animated. The actions animated may simply be illustrative actions that are not related to the actual actions of the BHA in drilling the borehole. In some embodiments, the animation may be related to the actual actions of the BHA during a drilling process, i.e., modeling the actual drilling and measurement operations (modeling mode). In the modeling mode, the rotation rates and the rate of penetration (ROP) of the BHA may be recreated according to the operation records. This would facilitate the correlation between the BHA data and the borehole geometry. Furthermore, the modeling mode may also facilitate the identification of any anomaly in the BHA data or formation measurement data resulting from unusual motions (vibration or shaking) of the BHA.

In the small view, the BHA components may also be displayed with information related to the components: types of components, rotation rates, stress or vibration, and other information. The user may interact with the BHA by picking the component(s) of interest with the mouse (or any input device). The user may then perform the desired actions on the picked components, such as moving or rotating the component in the borehole.

In some embodiments, the display in the big-view window (420 in FIG. 4) may be synchronized with the display in the small-view window (440 in FIG. 4). Similarly, the displays in the sub-windows in the big-view window or the small-view window may be synchronized. In the synchronized mode, any manipulation in one window also updates the corresponding display in the other window.

Figure 9:
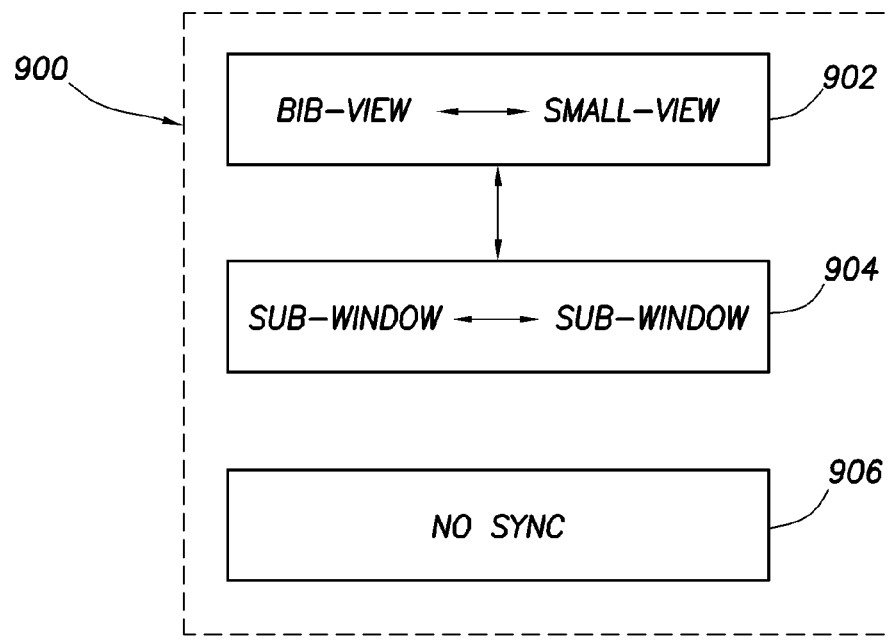
FIG. 9 illustrates a system for synchronization between different display windows in accordance with one embodiment of the invention.

FIG. 9 shows a diagram illustrating an exemplary synchronization system in accordance with an embodiment of the present invention. As shown in FIG. 9, the synchronization system 900 in accordance with the invention, for example, may support the following synchronization modes: a big view-to-small view (BS) sync mode 902, a sub-window-to-sub-window (SW) sync mode 904, and a no sync mode 906. Note that the BS sync mode 902 and the SW sync mode 904 may either be used separately or together. When used together, they provide a synchronization between the big-view, small-view, and sub-windows.

In the BS sync mode 902, changes made to either the big-view or the small-view window affect both windows. For example, when a user moves the BHA along the borehole trajectory in the big-view window, the corresponding display in the small-view window is updated to the same MD section, and vice versa. In some embodiments, navigation within the big-view window and the small-view window may be synchronized. For example, if a user rotates the borehole trajectory in the small view window, the corresponding display in the big view window may be concomitantly updated to match the view shown in the small view window.

In the SW sync mode 904, the display in one sub-window is synchronized with the corresponding display in the other sub-window. Accordingly, changes made to the display in one sub-window update the display in the other sub-window, and vice versa. In some embodiments of the invention, the BS sync mode 902 and the SW sync mode 904 may be used together.

In the no sync mode 906, none of the windows are synced with one another. Accordingly, changes made to any of the windows do not affect other windows.

Advantages of the invention may include one or more of the following. A method in accordance with the invention permits convenient display of BHA shapes and data together with a 3D borehole trajectory to facilitate analysis of BHA data. BHA shapes may be displayed inside, partially inside, or outside the borehole trajectory. Different transparencies, colors, and shapes may be used to illustrate different BHA components.

In accordance with some embodiments of the invention, the BHA and borehole trajectory are displayed in a big-view window so that the user is aware of the relative location of the BHA in the trajectory. At the same time, the BHA may be displayed with borehole trajectory in a small-view window to include details of the BHA data and/or borehole or formation data. The display in the small-view window facilitates detailed data analysis. In some embodiments, the BHA may be animated to recreate the motions of the BHA during the drilling operation. Being able to correlate BHA data with the borehole geometry and other formation measurement data allows for identification and correction of any anomaly in the BHA data.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for displaying a bottom-hole assembly together with a borehole trajectory, comprising:

displaying the borehole trajectory in a display window; and displaying the bottom-hole assembly in the display window such that the borehole trajectory and the bottom-hole assembly are in parallel and a measurement depth of the bottom-hole assembly corresponds to a measurement depth of the borehole trajectory.

2. The method of claim 1, wherein the bottom-hole assembly is rendered in surface shape inside the borehole trajectory and the borehole trajectory is displayed in a semitransparent color.

3. The method of claim 1, wherein the bottom-hole assembly is displayed outside the borehole trajectory, and wherein the bottom-hole assembly is displayed in a semitransparent color.

4. The method of claim 3, wherein the bottom-hole assembly is displayed in sections having different transparencies.

5. The method of claim 4, wherein the different transparencies are based on display widths of the sections of the bottom-hole assembly.

6. The method of claim 5, wherein the display widths of the sections of the bottom-hole assembly are based on distances between a camera position and locations of the sections of the bottom-hole assembly.

7. The method of claim 4, further comprising displaying information related to a section of the bottom-hole assembly.

8. The method of claim 1, wherein the bottom-hole assembly is rendered in surface shape outside the borehole trajectory.

9. The method of claim 8, wherein components in the bottom-hole assembly are rendered in different colors.

10. The method of claim 1, further comprising animating the displayed bottom-hole assembly.

11. The method of claim 10, wherein the animating corresponds to actions of the bottom-hole assembly during a drilling operation.

12. A method for displaying a bottom-hole assembly together with a borehole trajectory, comprising:

displaying the borehole trajectory in a first window;

displaying the bottom-hole assembly in the first window such that the borehole trajectory and the bottom-hole assembly are in parallel and a measurement depth of the bottom-hole assembly corresponds to a measurement depth of the borehole trajectory; and displaying an expanded view of the first window in a second window, wherein the expanded view includes a portion of the borehole trajectory and a corresponding section of the bottom-hole assembly.

13. The method of claim 12, wherein the bottom-hole assembly is rendered in surface shape inside the borehole trajectory and the borehole trajectory is displayed in a semitransparent color.

14. The method of claim 12, wherein the bottom-hole assembly is displayed outside the borehole trajectory, and wherein the bottom-hole assembly is displayed in a semitransparent color.

15. The method of claim 14, wherein the bottom-hole assembly is displayed in sections having different transparencies.

16. The method of claim 15, wherein the different transparencies are based on display widths of the sections of the bottom-hole assembly.

17. The method of claim 16, wherein the display widths of the sections of the bottom-hole assembly are based on distances between a camera position and locations of the sections of the bottom-hole assembly.

18. The method of claim 15, further comprising displaying information related to a section of the bottom-hole assembly.

19. The method of claim 12, wherein the bottom-hole assembly is rendered in surface shape outside the borehole trajectory.

20. The method of claim 19, wherein components in the bottom-hole assembly are rendered in different colors.

21. The method of claim 12, further comprising animating the displayed bottom-hole assembly.

22. The method of claim 21, wherein the animating corresponds to actions of the bottom-hole assembly during a drilling operation.

23. The method of claim 12, wherein the first window and the second window are synchronized such that a change in a point of interest in one window causes a change in a point of interest in the other window.

24. A system for displaying a bottom-hole assembly together with a borehole trajectory, the system comprising a processor and a memory storing a program having instructions for:

displaying the borehole trajectory in a display window; and displaying the bottom-hole assembly in the display window such that the borehole trajectory and the bottom-hole assembly are in parallel and a measurement depth of the bottom-hole assembly corresponds to a measurement depth of the borehole trajectory.

25. A system for displaying a bottom-hole assembly together with a borehole trajectory, the system comprising a processor and a memory storing a program having instructions for:

displaying the borehole trajectory in a first window;

displaying the bottom-hole assembly in the first window such that the borehole trajectory and the bottom-hole assembly are in parallel and a measurement depth of the bottom-hole assembly corresponds to a measurement depth of the borehole trajectory; and displaying an expanded view of the first window in a second window, wherein the expanded view includes a portion of the borehole trajectory and a corresponding section of the bottom-hole assembly.

* * * * *